(12) United States Patent
Ma et al.

(10) Patent No.: US 12,570,897 B2
(45) Date of Patent: Mar. 10, 2026

(54) METHOD FOR PREPARING CHEMILUMINESCENT HYDROGEL

(71) Applicant: Dalian Polytechnic University, Liaoning (CN)

(72) Inventors: Jiliang Ma, Liaoning (CN); Runcang Sun, Liaoning (CN); Dongnv Jin, Liaoning (CN)

(73) Assignee: DALIAN POLYTECHNIC UNIVERSITY, Dalian (CN)

( * ) Notice: Subject to any disclaimer, the term of this patent is extended or adjusted under 35 U.S.C. 154(b) by 799 days.

(21) Appl. No.: 17/915,787

(22) PCT Filed: Aug. 21, 2020

(86) PCT No.: PCT/CN2020/110495
§ 371 (c)(1),
(2) Date: Sep. 29, 2022

(87) PCT Pub. No.: WO2022/032714
PCT Pub. Date: Feb. 17, 2022

(65) Prior Publication Data
US 2023/0203370 A1 Jun. 29, 2023

(30) Foreign Application Priority Data

Aug. 14, 2020 (CN) .......................... 202010821000.3

(51) Int. Cl.
*C09K 11/07* (2006.01)
*C08J 3/075* (2006.01)

(52) U.S. Cl.
CPC .............. *C09K 11/07* (2013.01); *C08J 3/075* (2013.01); *C08J 2305/08* (2013.01); *C08J 2429/04* (2013.01); *C09K 2211/1018* (2013.01)

(58) Field of Classification Search
CPC ............ C09K 11/07; C09K 2211/1018; C09K 2211/1044; C08J 3/075; C08J 2305/08; C08J 2429/04
See application file for complete search history.

(56) References Cited

PUBLICATIONS

Lu et al., "Enhancing hydrogel-based long-lasting chemiluminescence by a platinum-metal organic framework and its application in array detection of pesticides and D-amino acids", Nanoscale, Jan. 20, 2020, 12, 4959-4967. (Year: 2020).*

* cited by examiner

*Primary Examiner* — Matthew E. Hoban
*Assistant Examiner* — Lynne Edmondson
(74) *Attorney, Agent, or Firm* — Thomas Horstemeyer, LLP

(57) ABSTRACT

A method for preparing a chemiluminescent hydrogel is disclosed, belonging to the field of luminescent materials. The method for preparing a chemiluminescent hydrogel includes the steps of: slowly adding chitosan to an acetic acid solution, stirring at room temperature until completely dissolved, adding a cobalt chloride solution, followed by a polyvinyl alcohol (PVA) solution, sufficiently stirring, ultrasonically defoaming, and subjecting a resulting mixture to an alkaline bath treatment with an alkaline solution, adding N-(4-aminobutyl)-N-ethylisoluminol (ABEI), and stirring with a hydrogen peroxide solution to obtain the chemiluminescent hydrogel. The synthesized hydrogel has the advantages of high luminous intensity and long duration. In the process, a high-water-cut polymer with a three-dimensional network structure obtained by chemical crosslinking with the addition of PVA features excellent biocompatibility, high elasticity, and nontoxicity, and is one of biomedical materials with application potential.

9 Claims, 1 Drawing Sheet

METHOD FOR PREPARING CHEMILUMINESCENT HYDROGEL

CROSS REFERENCE TO RELATED APPLICATION

This patent application claims the benefit and priority of Chinese Patent application No. 202010821000.3, filed on Aug. 14, 2020, the disclosure of which is incorporated by reference herein in its entirety as part of the present application.

TECHNICAL FIELD

The present disclosure relates to a novel and handy method for preparing a chemiluminescent hydrogel, and belongs to the field of luminescent materials.

BACKGROUND ART

Chemiluminescence is defined as light emitted as the result of a chemical reaction. Currently, chemiluminescence has been widely used in cold-light sources, bioassays, reporter genes, bioimaging, and biomarkers. Intensive and long-lasting light is critical to cold light sources in emergency, decorative entertainment, and underwater lighting However, most of known chemiluminescence is in the form of flash-type light, and does not have high-intensity and long-lasting properties, which hinder its further applications.

Chemiluminescent materials are synthesized by loading chemiluminescent reagents on the surface or inside the substrates, and have excellent chemiluminescent properties. These substrates are carriers of chemiluminescent reagents, and their interactions can provide chemiluminescent functionalized materials with unique performance. For example, the chemiluminescent reaction can be promoted by means of catalytic properties of the substrate materials, thereby producing higher-intensity chemiluminescence.

Hydrogel is a macromoleclar polymer with three-dimensional structure, is obtained by crosslinking with hydrophilic macromolecular compounds, and can swell in water and retain lots of moisture without dissolution. Meanwhile, with excellent biocompatibility, the hydrogel has broad application prospects in the fields of drug delivery systems, biomimetic materials, and chemical mechanical systems.

At present, most of luminescent hydrogels have problems of complex preparation, short luminescent time, and low intensity. Therefore, it is necessary to find a luminescent hydrogel that allows for simple synthesis, environmental friendliness, high luminous intensity, and long luminescent time.

SUMMARY

An objective of the present disclosure is to provide a novel and handy method for preparing a chemiluminescent hydrogel, aiming to solve the problems of short luminescent time and low intensity of existing chemiluminescent systems. The present disclosure adopts a simple method, namely, using chitosan as a raw material to prepare a substrate hydrogel as a luminescent reagent carrier and thus synthesizing a strong and durable chemiluminescent hydrogel. The preparation method provided by the present disclosure is simple, manageable, "green", and pollution-free.

To achieve the above objective, the present disclosure adopts the following technical solutions:

a novel and handy method for preparing a chemiluminescent hydrogel, including the following steps:

step 1, adding chitosan to an acetic acid solution, and stirring until the chitosan is completely dissolved, where the acetic acid solution has a volume fraction of 1.0-10.0% (v/v), and the chitosan and the acetic acid solution have a ratio of (0.5-1.5) g:(15.0-25.0) mL;

step 2, adding a cobalt chloride solution and a polyvinyl alcohol (PVA) solution to a product obtained in step 1, stirring evenly, and ultrasonically defoaming, where the cobalt chloride solution has a concentration of 15-60 mmol/L, the PVA solution has a mass fraction of 5.0-10.0%, and the acetic acid solution, the cobalt chloride solution and the PVA solution have a volume ratio of (15.0-25.0):(0.5-2.0):(0-10.0);

step 3, soaking a mixture obtained in step 2 in an alkaline solution for alkaline bath treatment, and letting the mixture stand overnight to obtain a hydrogel, where the alkaline solution has a concentration of 1.0-10.0 mol/L; and step 4, mixing a product obtained in step 3 with an N-(4-aminobutyl)-N-ethylisoluminol (ABEI) solution, stirring evenly, adding a resulting mixture to a hydrogen peroxide solution to obtain the chemiluminescent hydrogel, where the N-(4-aminobutyl)-N-ethylisoluminol (ABEI) solution has a concentration of 1-24 mmol/L, the hydrogen peroxide solution has a concentration of 0.01-1.00 mol/L, and the product obtained in step 3, the N-(4-aminobutyl)-N-ethylisoluminol (ABEI) solution, and the hydrogen peroxide solution have a volume ratio of (1-3):(1-3):(2-6).

According to the foregoing technical solution, preferably, in step 1, the acetic acid solution may have a volume fraction of 2.0%.

According to the foregoing technical solution, preferably, in step 1, the chitosan and the acetic acid solution may have a ratio of 1.0 g:20.0 mL.

According to the foregoing technical solution, preferably, in step 2, the cobalt chloride solution may have a concentration of 30 mmol/L.

According to the foregoing technical solution, preferably, in step 2, the PVA solution may have a mass fraction of 10%.

According to the foregoing technical solution, preferably, in step 2, the acetic acid solution, the cobalt chloride solution and the PVA solution may have a volume ratio of 20.0:1.0:3.0.

According to the foregoing technical solution, preferably, in step 3, the alkaline solution may be selected from the group consisting of a KOH solution, a NaOH solution, a $Ca(OH)_2$ solution, and a $Na_2CO_3$ solution, and preferably the KOH solution.

According to the foregoing technical solution, preferably, in step 3, the alkaline solution may have a concentration of 4.0 mol/L.

According to the foregoing technical solution, preferably, in step 3, the mixture obtained in step 2 and the alkaline solution may have a volume ratio of (1-5):(3-15), and preferably (1-5):10.

According to the foregoing technical solution, preferably, in step 4, the N-(4-aminobutyl)-N-ethylisoluminol (ABEI) solution may have a concentration of 12 mmol/L.

According to the foregoing technical solution, preferably, in step 4, the hydrogen peroxide solution may have a concentration of 0.50 mol/L.

According to the foregoing technical solution, preferably, in step 4, the product obtained in step 3, the N-(4-aminobutyl)-N-ethylisoluminol (ABEI) solution, and the hydrogen peroxide solution may have a volume ratio of 1:1:2.

According to the foregoing technical solution, preferably, in step 4, the product obtained in step 3 may be evenly pulverized, ground or crushed, mixed with the N-(4-aminobutyl)-N-ethylisoluminol (ABEI) solution, stirred evenly, and supplemented with the hydrogen peroxide solution to obtain the chemiluminescent hydrogel.

The present disclosure further relates to a chemiluminescent hydrogel prepared by the foregoing method.

The preparation process of the chemiluminescent hydrogel provided by the present disclosure is a manageable, environmentally friendly, and green synthesis method. The chemiluminescent hydrogel synthesized by the present disclosure has high chemiluminescence intensity and long duration. The raw material chitosan used in the present disclosure comes from a variety of sources, is inexpensive and easily available, has excellent biocompatibility, safety, and biodegradability, and is an ideal material for preparing hydrogels. In the process, a high-water-cut polymer with a three-dimensional network structure obtained by chemical crosslinking with the addition of PVA features excellent biocompatibility, high elasticity, and nontoxicity, and is one of biomedical materials with application potential in $21^{st}$ century.

The synthesis method provided by the present disclosure has the following advantages:

(1) the present disclosure uses inexpensive, non-toxic, renewable, biodegradable, and well-biocompatible chitosan as a raw material to prepare a luminescent hydrogel, which is beneficial to environmental protection;

(2) the method is easy to operate, and the reaction conditions are easy to control;

(3) the chemiluminescent hydrogel prepared by the present disclosure has environmental friendliness and biocompatibility; and (4) the product provided by the present disclosure provides an effective way to solve the problem of short chemiluminescent time of chemiluminescent materials.

DETAILED DESCRIPTION OF THE EMBODIMENTS

Figure 1:
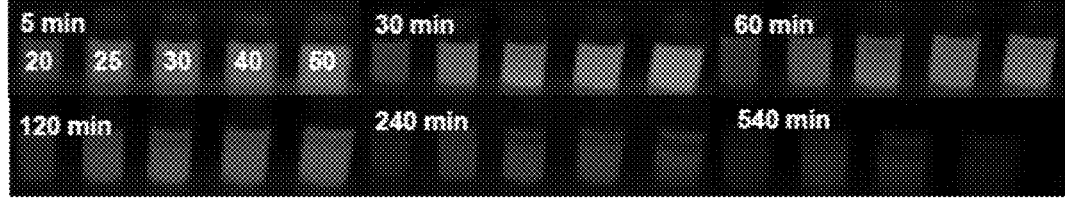
FIG. 1 illustrates effects of cobalt chloride solution concentrations on the luminescent time and luminous intensity of chemiluminescent hydrogel materials in Examples 1 and 2.

To better understand the technical characteristics of the present disclosure, the present disclosure will be further described below with reference to examples, but the protection scope claimed by the present disclosure is not limited thereto.

Example 1

The example provided a method for preparing a chemiluminescent hydrogel, including the following steps:

step 1, 1.0 g of chitosan was accurately weighed and added to 20 mL of 2% acetic acid solution, and stirred at room temperature until the chitosan was completely dissolved;

step 2, 1.0 mL of 30 mmol/L cobalt chloride solution and PVA solution (the amount of PVA solution was 0 mL, 1.0 mL, 3.0 mL, 5.0 mL, and 10.0 mL, respectively, and the mass fraction of the PVA solution was 10%) were added to the product obtained in step 1, stirred evenly, and ultrasonically defoamed;

step 3, the mixture obtained in step 2 was soaked in 50 mL of 4.0 mol/L solution for alkaline bath treatment, and let stand overnight;

step 4, the product obtained in step 3 was evenly pulverized; 1.0 mL of the product was pipetted, mixed with 1.0 mL of 4.0 mmol/L ABEI solution, and stirred evenly;

step 5, the product obtained in step 4 was added to 2.0 mL of 0.50 mol/L hydrogen peroxide solution to obtain the chemiluminescent hydrogel; and step 6, the chemiluminescent time of a series of materials obtained in step 5 was observed in the dark, and their luminous intensities were simply determined.

Example 2

The example provided a method for preparing a chemiluminescent hydrogel, including the following steps:

step 1, the operation was the same as that in step 1 of Example 1;

step 2, 1.0 mL of cobalt chloride solution (concentrations were 20 mmol/L, 25 mmol/L, 40 mmol/L, and 50 mmol/L, respectively) and 3.0 mL of PVA solution (its mass fraction was 10%) were added to the product obtained in step 1, stirred evenly, and ultrasonically defoamed;

step 3, the operation was the same as that in step 3 of Example 1;

step 4, the operation was the same as that in step 4 of Example 1;

step 5, the operation was the same as that in step 5 of Example 1; and step 6, the chemiluminescent time of a series of materials obtained in step 5 was observed in the dark, and their luminous intensities were simply determined.

Example 3

The example provided a method for preparing a chemiluminescent hydrogel, including the following steps:

step 1, the operation was the same as that in step 1 of Example 1;

step 2, 1.0 mL of 30 mmol/L cobalt chloride solution and 3.0 mL of PVA solution (its mass fraction was 10%) were added to the product obtained in step 1, stirred evenly, and ultrasonically defoamed;

step 3, the mixture obtained in step 2 was soaked in 50 mL of KOH solution (concentrations were 3.0 mol/L, 5.0 mol/L, 7.0 mol/L, and 9.0 mol/L, respectively) for alkaline bath treatment, and let stand overnight;

step 4, the operation was the same as that in step 4 of Example 1;

step 5, the operation was the same as that in step 5 of Example 1; and step 6, the chemiluminescent time of a series of materials obtained in step 5 was observed in the dark, and their luminous intensities were simply determined.

Example 4

The example provided a method for preparing a chemiluminescent hydrogel, including the following steps:

step 1, the operation was the same as that in step 1 of Example 1;

step 2, 1.0 mL of 30 mmol/L cobalt chloride solution and 3.0 mL of PVA solution (its mass fraction was 10%) were added to the product obtained in step 1, stirred evenly, and ultrasonically defoamed;

step 3, the operation was the same as that in step 3 of Example 1;

step 4, the product obtained in step 3 was evenly pulverized; 1.0 mL of the product was pipetted, mixed with 1.0 mL of ABEI solution (concentrations were 1 mmol/L, 2 mmol/L, 3 mmol/L, and 8 mmol/L, respectively), and stirred evenly;

step 5, the operation was the same as that in step 4 of Example 1; and step 6, the chemiluminescent time of a series of materials obtained in step 5 was observed in the dark, and their luminous intensities were simply determined.

Example 5

The example provided a method for preparing a chemiluminescent hydrogel, including the following steps:

step 1, the operation was the same as that in step 1 of Example 1;

step 2, 1.0 mL of 30 mmol/L cobalt chloride solution and 3.0 mL of PVA solution (its mass fraction was 10%) were added to the product obtained in step 1, stirred evenly, and ultrasonically defoamed;

step 3, the operation was the same as that in step 3 of Example 1;

step 4, the product obtained in step 3 was evenly pulverized; 1.0 mL of the product was pipetted, mixed with 1.0 mL of 12 mmol/L ABEI solution, and stirred evenly;

step 5, the operation was the same as that in step 5 of Example 1; and step 6, the chemiluminescent time of a series of materials obtained in step 5 was observed in the dark, and their luminous intensities were simply determined.

Example 6

The example provided a method for preparing a chemiluminescent hydrogel, including the following steps:

step 1, the operation was the same as that in step 1 of Example 1;

step 2, the operation was the same as that in step 2 of Example 4;

step 3, the operation was the same as that in step 3 of Example 1;

step 4, the product obtained in step 3 was evenly pulverized; 1.0 mL of the product was pipetted, mixed with 1.0 mL of 12 mmol/L ABEI solution, and stirred evenly;

step 5, the product obtained in step 4 was added to 2.0 mL of hydrogen peroxide solution (concentrations were 0.01 mol/L, 0.05 mol/L, 0.10 mol/L, 0.30 mol/L, and 1.00 mol/L, respectively); and step 6, the chemiluminescent time of a series of materials obtained in step 5 was observed in the dark, and their luminous intensities were simply determined.

FIG. 1 illustrates effects of different cobalt chloride solution concentrations on the luminescent time of chemiluminescent hydrogel materials in Examples 1 and 2, where the amount of the PVA solution in Example 1 was 3.0 mL, the cobalt chloride solution concentration is 30 mmol/L, and cobalt chloride solution concentrations in Example 2 are 20 mmol/L, 25 mmol/L, 40 mmol/L, and 50 mmol/L, respectively; the data annotated in the figure, from left to right, correspond to the luminescence of chemiluminescent hydrogel materials prepared with 20 mmol/L, 25 mmol/L, 30 mmol/L, 40 mmol/L, and 50 mmol/L cobalt chloride solutions at 5 min, 30 min, 60 min, 120 min, 240 min, and 540 min, respectively. Experimental results find that the cobalt chloride solution concentration has a great effect on the luminescent time of the material; as the cobalt chloride solution concentration is increased, the luminescent time is gradually prolonged; when the cobalt chloride solution concentration is 30 mmol/L, the luminescent time peaks; as the cobalt chloride solution concentration is further increased, the luminous intensity is gradually decreased, indicating that the material achieves a better luminescent effect when the cobalt chloride solution concentration is 30 mmol/L.

Figure 2:
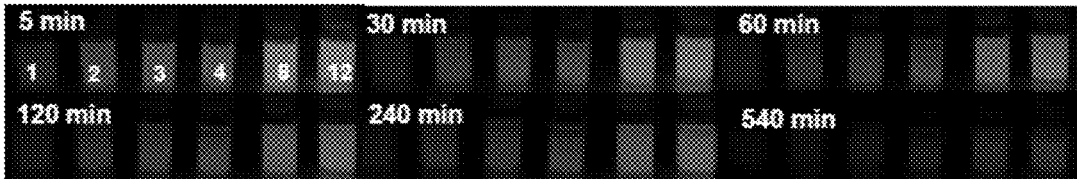
FIG. 2 illustrates effects of ABEI solution concentrations on the luminescent time and luminous intensity of chemiluminescent hydrogel materials in Examples 1, 4 and 5.

FIG. 2 illustrates effects of different ABEI solution concentrations on the luminescent time of chemiluminescent hydrogel materials in Examples 1, 4 and 5, where the amount of the PVA solution in Example 1 was 3.0 mL, the ABEI solution concentration is 4 mmol/L, ABEI solution concentrations in Example 4 are 1 mmol/L, 2 mmol/L, 3 mmol/L, and 8 mmol/L, respectively, and the ABEI solution concentration in Example 5 is 12 mmol/L; the data annotated in the figure, from left to right, correspond to the luminescence of chemiluminescent hydrogel materials prepared with 1 mmol/L, 2 mmol/L, 3 mmol/L, 4 mmol/L, 8 mmol/L and 12 mmol/L. ABEI solutions at 5 min, 30 min, 60 min, 120 min, 240 min, and 540 min, respectively. Experimental results find that the ABEI solution concentration has a great effect on the luminescent time of the material; as the ABEI solution concentration is increased, the luminescent time is gradually prolonged; when the ABEI solution concentration is 4 mmol/L, the luminescent time peaks; as the ABEI solution concentration is further increased, the luminous intensity is gradually decreased, indicating that the material achieves a better luminescent effect when the ABEI solution concentration is 4 mmol/L.

Figure 3:
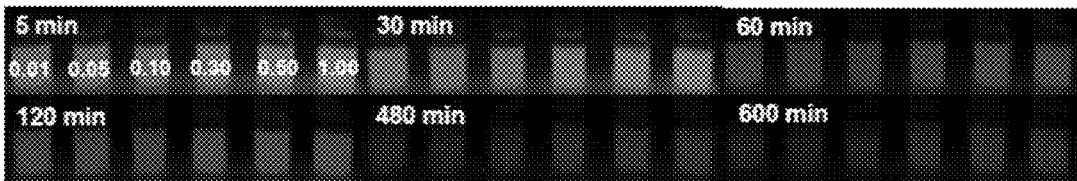
FIG. 3 illustrates effects of hydrogen peroxide solution concentrations on the luminescent time and luminous intensity of chemiluminescent hydrogel materials in Examples 5 and 6.

FIG. 3 illustrates effects of different hydrogen peroxide solution concentrations on the luminescent time of chemiluminescent hydrogel materials in Examples 5 and 6, where the hydrogen peroxide solution concentration is 0.50 mmol/L in Example 5, and hydrogen peroxide solution concentrations in Example 6 are 0.01 mol/L, 0.05 mol/L, 0.10 mol/L, 0.30 mmol/L, and 1.00 mol/L, respectively; the data annotated in the figure, from left to right, correspond to the luminescence of chemiluminescent hydrogel materials prepared with 0.01 mol/L, 0.05 mol/L, 0.10 mol/L, 0.30 mmol/L, 0.50 mmol/L, and 1.00 mol/L hydrogen peroxide solutions at 5 min, 30 min, 60 min, 120 min, 480 min, and 600 min, respectively. Experimental results find that the hydrogen peroxide solution concentration has a great effect on the luminescent time of the material; as the hydrogen peroxide solution concentration is increased, the luminescent time is gradually prolonged; when the hydrogen peroxide solution concentration is 0.50 mol/L, the luminescent time peaks and it is extended to 600 min; as the hydrogen peroxide solution concentration is further increased, the luminous intensity is gradually decreased, indicating that the material achieves a better luminescent effect when the hydrogen peroxide solution concentration is 0.50 mol/L.

The above examples are partial implementations of the present disclosure, but the implementations of the present disclosure are not limited thereto, and any other changes, substitutions, combinations, and simplifications made with departing from the spirit, essence, and principle of the present disclosure should be regarded as equivalent displacements and included in the protection scope of the present disclosure.

What is claimed is:

1. A method for preparing a chemiluminescent hydrogel, comprising the following steps:

step 1, adding chitosan to an acetic acid solution, and stirring until the chitosan is completely dissolved;

wherein the acetic acid solution has a volume fraction of 1.0-10.0%, and the chitosan and the acetic acid solution have a ratio of (0.5-1.5) g:(15.0-25.0) mL;

step 2, adding a cobalt chloride solution and a polyvinyl alcohol (PVA) solution to a product obtained in step 1, stirring evenly, and ultrasonically defoaming;

wherein the cobalt chloride solution has a concentration of 15-60 mmol/L, the PVA solution has a mass fraction of 5.0-10.0%, and the acetic acid solution, the cobalt chloride solution and the PVA solution have a volume ratio of (15.0-25.0):(0.5-2.0):(0-10.0);

step 3, soaking a mixture obtained in step 2 in an alkaline solution for alkaline bath treatment, and letting the mixture stand overnight to obtain a hydrogel;

wherein the alkaline solution has a concentration of 1.0-10.0 mol/L; and step 4, mixing a product obtained in step 3 with an N-(4-aminobutyl)-N-ethylisoluminol solution, stirring evenly, adding a resulting mixture to a hydrogen peroxide solution to obtain the chemiluminescent hydrogel;

wherein the N-(4-aminobutyl)-N-ethylisoluminol solution has a concentration of 1-24 mmol/L, the hydrogen peroxide solution has a concentration of 0.01-1.00 mol/L, and the product obtained in step 3, the N-(4- aminobutyl)-N-ethylisoluminol solution, and the hydrogen peroxide solution have a volume ratio of (1-3):(1-3):(2-6).

2. The method for preparing a chemiluminescent hydrogel according to claim 1, wherein in step 3, the mixture obtained in step 2 and the alkaline solution have a volume ratio of (1-5):(3-15).

3. The method for preparing a chemiluminescent hydrogel according to claim 1, wherein in step 1, the acetic acid solution has a volume fraction of 2.0%, and the chitosan and the acetic acid solution have a ratio of 1.0 g:20.0 mL.

4. The method for preparing a chemiluminescent hydrogel according to claim 1, wherein in step 2, the cobalt chloride solution has a concentration of 30 mmol/L, the PVA solution has a mass fraction of 10%, and the acetic acid solution, the cobalt chloride solution and the PVA solution have a volume ratio of 20.0:1.0:3.0.

5. The method for preparing a chemiluminescent hydrogel according to claim 1, wherein in step 3, the alkaline solution is selected from the group consisting of a KOH solution, a NaOH solution, a $Ca(OH)_2$ solution, and a $Na_2CO_3$ solution.

6. The method for preparing a chemiluminescent hydrogel according to claim 1, wherein in step 3, the alkaline solution has a concentration of 4.0 mol/L.

7. The method for preparing a chemiluminescent hydrogel according to claim 2, wherein in step 3, the mixture obtained in step 2 and the alkaline solution have a volume ratio of (1-5):10.

8. The method for preparing a chemiluminescent hydrogel according to claim 1, wherein in step 4, the N-(4-aminobutyl)-N-ethylisoluminol solution has a concentration of 12 mmol/L, the hydrogen peroxide solution has a concentration of 0.50 mol/L, and the product obtained in step 3, the N-(4-aminobutyl)-N-ethylisoluminol solution, and the hydrogen peroxide solution have a volume ratio of 1:1:2.

9. The method for preparing a chemiluminescent hydrogel according to claim 1, wherein in step 4, the product obtained in step 3 is evenly pulverized, ground or crushed, mixed with the N-(4-aminobutyl)-N-ethylisoluminol solution, stirred evenly, and supplemented with the hydrogen peroxide solution to obtain the chemiluminescent hydrogel.

* * * * *